United States Patent [19]

Hsu et al.

[11] Patent Number: 5,172,650
[45] Date of Patent: Dec. 22, 1992

[54] AQUARIUM HAVING AN INTERNAL THREE CHAMBER RECIRCULATING FILTRATION SYSTEM

[76] Inventors: Ke-Yo Hsu, No. 14, Lane 86, Ta Lung Road; Kuo-Hsiung Shen, No. 559, Sec. 1, Chung Te Road, both of Taichung, Taiwan

[21] Appl. No.: 791,142

[22] Filed: Nov. 13, 1991

[51] Int. Cl.[5] .............................................. A01K 63/04
[52] U.S. Cl. ........................................... 119/5; 210/169
[58] Field of Search ................ 119/5; 210/169, 248, 210/312

[56] References Cited

U.S. PATENT DOCUMENTS

| | | |
|---|---|---|
| 3,566,840 | 3/1971 | Willinger ................................ 119/5 |
| 3,893,421 | 7/1975 | Dinnerstein ........................... 119/5 |
| 3,927,643 | 12/1975 | Ritzow et al. ......................... 119/5 |
| 4,098,230 | 7/1978 | Jackson ................................. 119/5 |
| 4,844,013 | 7/1989 | de Hann et al. ...................... 119/5 |
| 5,062,950 | 11/1991 | Shieh .................................... 119/5 |

FOREIGN PATENT DOCUMENTS

| | | | |
|---|---|---|---|
| 2701382 | 7/1978 | Fed. Rep. of Germany .......... 119/5 |
| 604575 | 7/1948 | United Kingdom ................... 119/5 |
| 1329962 | 9/1973 | United Kingdom ................... 119/5 |
| 2198051 | 6/1988 | United Kingdom ................... 119/5 |
| 2226940 | 7/1990 | United Kingdom ................... 119/5 |

*Primary Examiner*—John J. Wilson
*Assistant Examiner*—Todd E. Manahan
*Attorney, Agent, or Firm*—Bacon & Thomas

[57] ABSTRACT

An aquarium for keeping live water animals and water plants is disclosed which includes a housing and a filter tank fastened inside the housing at one side thereof. The filter tank includes a dirty water chamber for receiving water from the housing, a filtration chamber separated from the dirty water chamber and a clean water chamber for receiving water from the filtration chamber. In one embodiment, a pipe assembly is used to guide water from the dirty water chamber to the filtration chamber or to discharge water out of the filtration chamber. The filter tank further includes a water pump for pumping water from the clean water chamber to the housing so as to induce water contained in the housing to circulate through the filtration chamber for filtration through a filter bed. In a second embodiment, the pipe assembly is replaced by a sluice controlled opening between the dirty water chamber and the filtration chamber and a drainage pipe and valve arrangement opening into the filtration chamber.

3 Claims, 6 Drawing Sheets

AQUARIUM HAVING AN INTERNAL THREE CHAMBER RECIRCULATING FILTRATION SYSTEM

BACKGROUND OF THE INVENTION

1. Field of the Invention

The present invention relates to aquariums and more particularly, to an aquarium in which the filter tank can be conveniently washed and cleaned without detaching it from the housing of the aquarium.

2. Description of the Prior Art

In an aquarium, there is generally provided a filter device for filtering the water contained therein so as to minimize the frequency in changing the water. FIG. 1 illustrates an aquarium constructed according to the prior art, wherein a filter device is detachably fastened to the top of the aquarium and is connected to a water pump which pumps water from the aquarium through the filter device for circulation. This filter device does not have any sedimentation chamber for collecting any solid particles removed from the water passing therethrough. Therefore, the filter bed or filter element in the filter device may be easily blocked, thereby affecting its performance. When the filter bed is blocked, the filter device must be removed from the aquarium and dismantled for cleaning. Therefore, it is not easy to clean the filter device.

In addition, a conventional aquarium is generally difficult to set up and often requires the aid of a professional person. Furthermore, such aquariums undesirably occupy rather large spaces during transportation or storage.

SUMMARY OF THE INVENTION

The present invention is proposed to eliminate the aforesaid problems. It is therefore an object of the present invention to provide an aquarium which has a filter tank fastened therein for automatically circulating the water through a filter bed permitting the debris from the filtration process to be discharged out of the aquarium without the need to detach any part of the aquarium. It is another object of the present invention to provide an aquarium which can be conveniently detached for delivery or storage.

BRIEF DESCRIPTION OF THE DRAWINGS

The foregoing and other objects, features and advantages of the present invention will be best understood from the following description of preferred embodiments of the invention, the appended claims and the accompanying drawings in which:

DETAILED DESCRIPTION OF THE PREFERRED EMBODIMENT

Figure 2:
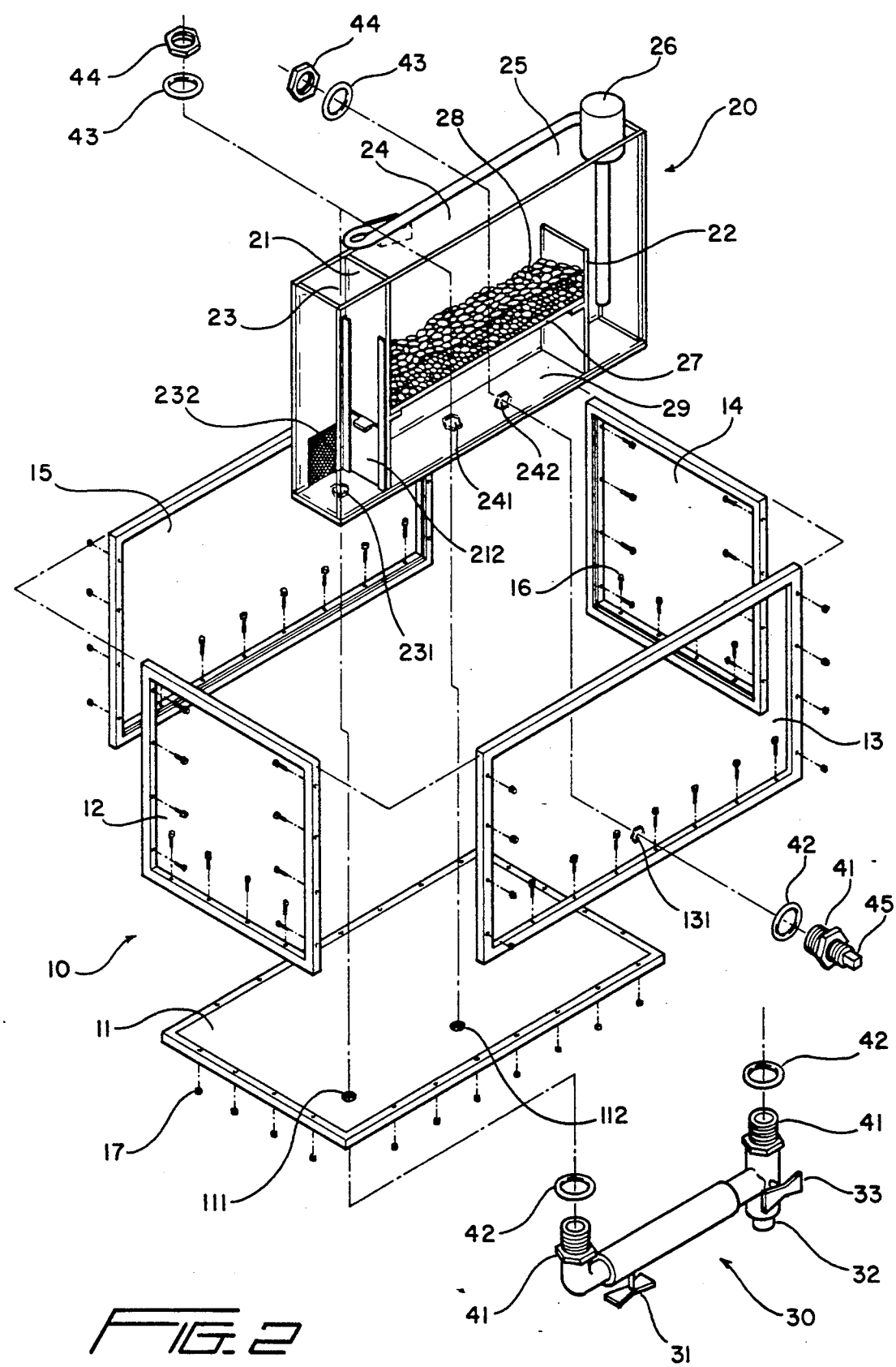
FIG. 2 is an exploded perspective view of a aquarium embodying the present invention.
Figure 3:
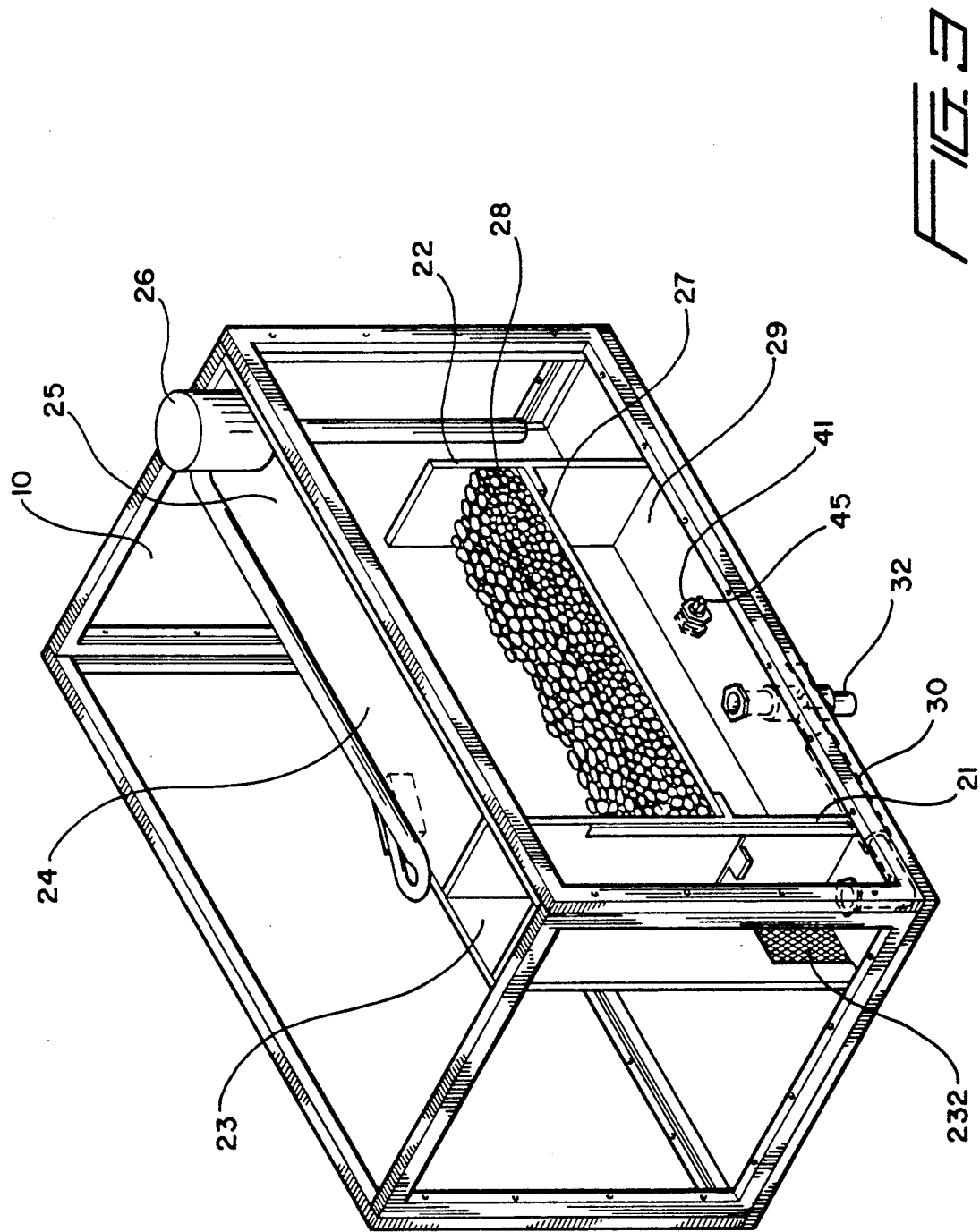
FIG. 3 is a perspective assembly view of the aquarium of FIG. 2.

Referring to FIGS. 2 and 3, an aquarium as constructed in accordance with the present invention is generally comprised of a housing 10 for keeping live water animals and water plants, a filter tank 20 for filtering dirty water from housing 10, and a pipe assembly 30 for guiding water from housing 10 into filter tank 20 and/or for discharging water out of filter tank 20. The housing 10 is comprised of a base panel 11 transversely disposed at the bottom and four side panels 12, 13, 14, 15 vertically disposed at the four sides thereof. Each panel 11, 12, 13, 14 or 15 consists of a rectangular frame with a sheet of glass fastened therein. The panels 11, 12, 13, 14, 15 each has a plurality of holes around the periphery of the rectangular frame thereof at equal intervals, and therefore, they can be interconnected by screws 16 and nuts 17. During assembly process of housing 10, the gap between adjacent panels must be sealed with a rubber packing or water seal (not shown) to prohibit water leakage. The base panel 11 further has two through-holes 111, 112 formed therein at suitable locations. One of the vertical panels, namely, the panel 13 also has a through-hole 131 formed therein at a suitable location for the reason which will be more fully discussed below location.

The filter tank 20 is made from a hollow, rectangular, enclosed frame having an opening at the top. The height of the filter tank 20 is approximately equal to the height of the housing 10. A longer partition board 21 and a shorter partition board 22 are fastened in the filter tank 20 at two laterally spaced locations and are vertically disposed so as to divide the holding space of the filter tank 20 into three chambers, namely, a dirty water chamber 23 at one end, a filtration chamber 24 at the middle and a clean water chamber 25 at an opposite end. The filtration chamber 24 defines therein a sedimentation chamber 29 at the bottom and has a filter bed transversely disposed above sedimentation chamber 29. The filter bed is composed of a gauze filter 27 and a pile of filter stones 28. The filter tank 20 further has three through-holes 231, 241, 242 at locations corresponding to the through-holes 111, 112, 131 in the housing 10, wherein the through-hole 231 is made on the bottom edge of the dirty water chamber 23; the through-hole 241 is made in the bottom edge of the sedimentation chamber 29; and the through-hole 242 is made in the side wall of the filter tank 20 corresponding to the sedimentation chamber 29. When the through-holes in the filter tank 20 are respectively aligned with the through-holes in the housing 10, pipe connectors 41 are respectively fastened therein and locked by lock nuts 44 with water sealing rings 42, 43 respectively retained therebetween to seal the gap, and therefore, the filter tank 20 is firmly secured in the housing 10 at one side thereof. The clean water chamber 25 has a water pump 26 fastened therein for pumping clean water from the clean water chamber 25 to the housing 10. The dirty water chamber 23 has a port 232, at a low position therein, disposed in communication with the interior of the housing 10.

The pipe assembly 30 is made from a three-way pipe having a first port connected to the pipe connector 41 at the through-holes 111, 231; a second port connected to the pipe connector 41 at the through-holes 112, 241; and a third port connected to a drain pipe 32. The pipe assembly 30 further comprises a first control valve 31 for controlling the passageway from the first port to the second port, and a second control valve 33 for controlling the passageway from the second port to the drain pipe 32. After the pipe assembly 30 has been connected to the two pipe connectors 41 on the bottom edge of the housing 10, the other pipe connector 41 at through-holes 131, 242 is sealed with a plug 45 (see FIG. 3).

Figure 1:
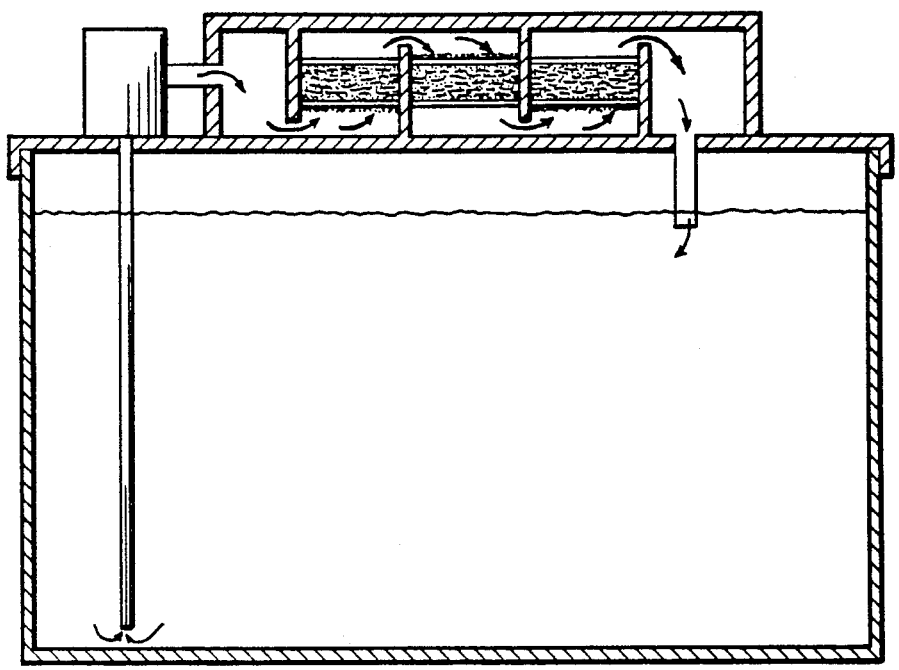
FIG. 1 is a schematic structural view of a prior art aquarium.
Figure 5:
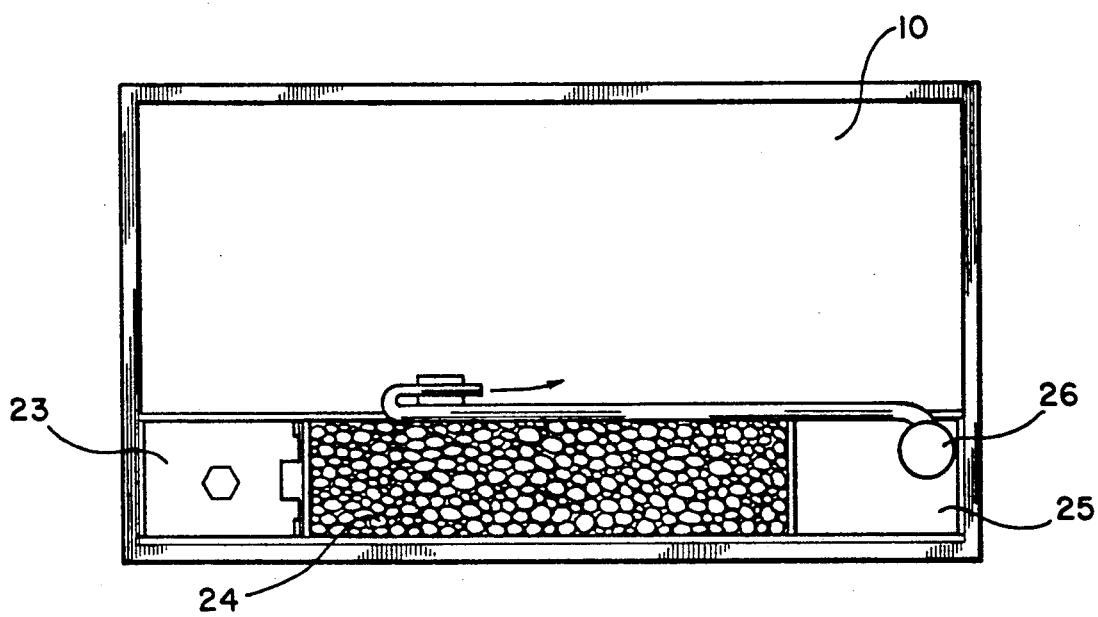
FIG. 5 is a top view of the aquarium of FIG. 2.

FIG. 5 illustrates the arrangement of the outlet port of the water pump 26. Because the outlet port of the water pump 26 is disposed in a horizontal direction, filling water from the clean water chamber 25 into the housing 10 will only cause the upper part of the water which is contained in the housing 10 to rotate moderately. Therefore, any sediments in the housing 10 will not be stirred up during the filling of cleaning water.

Figure 6:
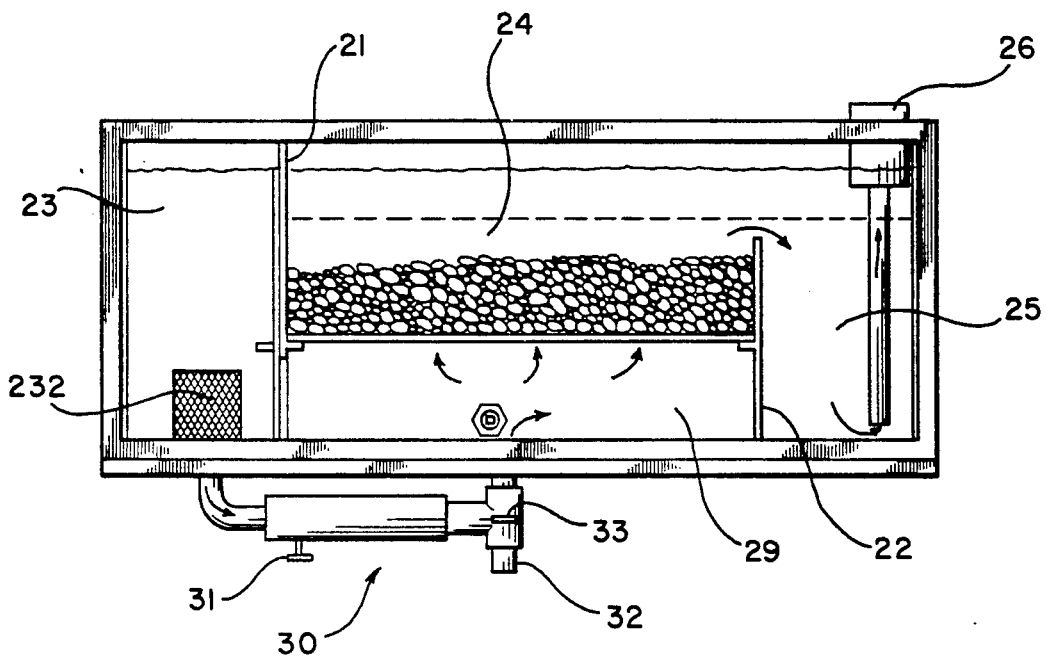
FIG. 6 is a plan side view of the aquarium of FIG. 2 showing the flowing direction of the water in the aquarium during a filtration process.
Figure 7:
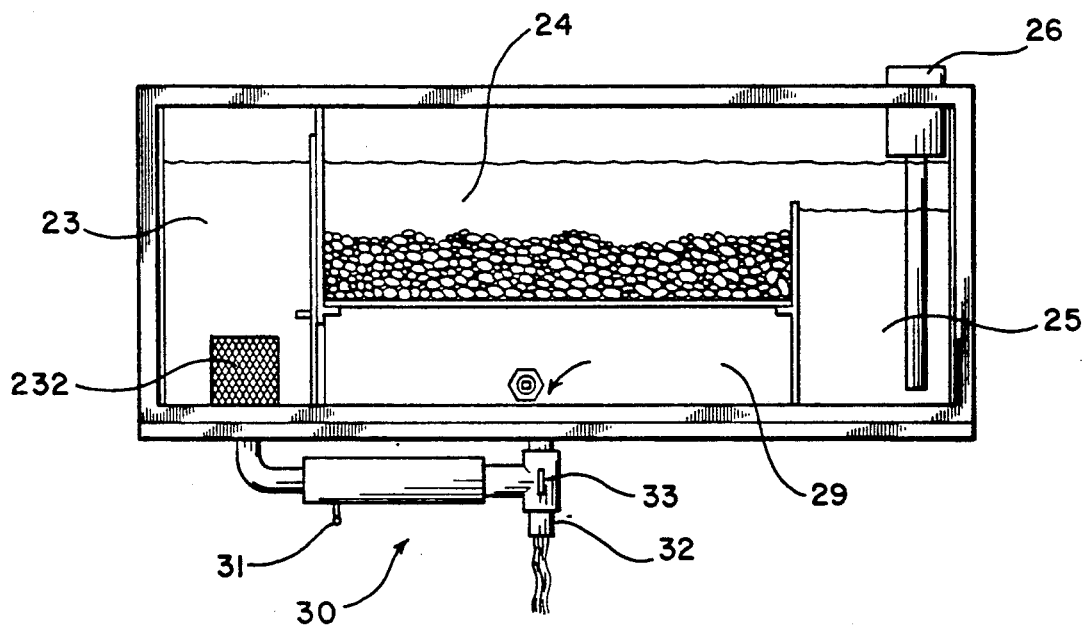
FIG. 7 is another plan side view of the aquarium of FIG. 2 showing the manner in which the water contained in the sedimentation chamber is discharged through the pipe assembly.

Referring to FIGS. 6 and 7, when the water pump 26 is not operating, the water in the housing 10 and the water in the filter tank 20 are maintained at the same level (as shown by the solid line in FIG. 6). When the water pump 26 is turned on, the water level in the filtration chamber 24 and the clean water chamber 25 drops (see the dotted line in FIG. 6). While clean water is pumped from the clean water chamber 25 into the housing 10, the water which comes from the sedimentation chamber through the filter bed is induced to flow into the clean water chamber 25 so as to make up for the deficiency, and therefore, the water level in the filtration chamber 24 and the clean water chamber 25 remains unchanged. While clean water is pumped from the clean water chamber 25 into the housing 10, the water held in the dirty water chamber 23 will be induced to flow toward the sedimentation chamber 29 and then induced again to flow through the filter bed over the shorter partition board 22 toward the clean water chamber 25 for further circulation. During this water circulation process, dirt and solid particles in the dirty water chamber 23 will be carried by the water through pipe assembly 30 to the sedimentation chamber 29. At the same time, dirt and solid particles in the housing 10 will be carried by water through the port 232 into the dirty water chamber 23 for further circulation through the filtration chamber 24. Therefore, clean water is continuously fed into the housing 10 while dirty water is induced to flow out of the housing 10.

Referring to FIG. 7, the first control valve 31 of the pipe assembly 30 is closed while the water pump 26 is stopped, and then, the second control valve 33 of the pipe assembly 30 is opened permitting dirty water to be discharged out of the sedimentation chamber 29 of the filter tank 20. Because the first control valve 31 is closed, the water contained in the housing 10 is prevented from flowing into the filtration chamber 24. When the water contained in the filtration chamber 24 is completely drained off, clean water from an external water supply can be used to flush the filter bed 27-28.

Figure 4:
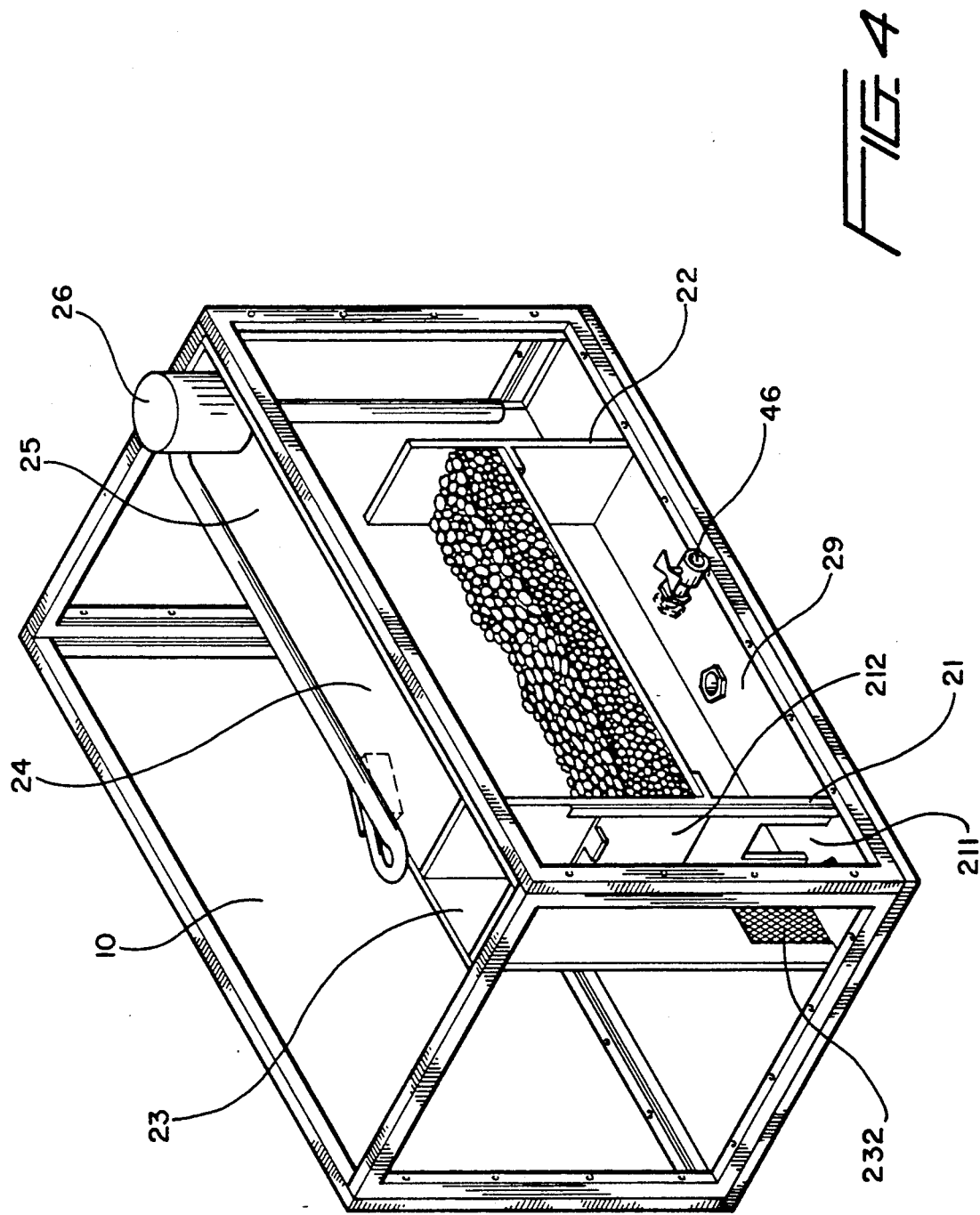
FIG. 4 illustrates an alternate form of the present invention.
Figure 8:
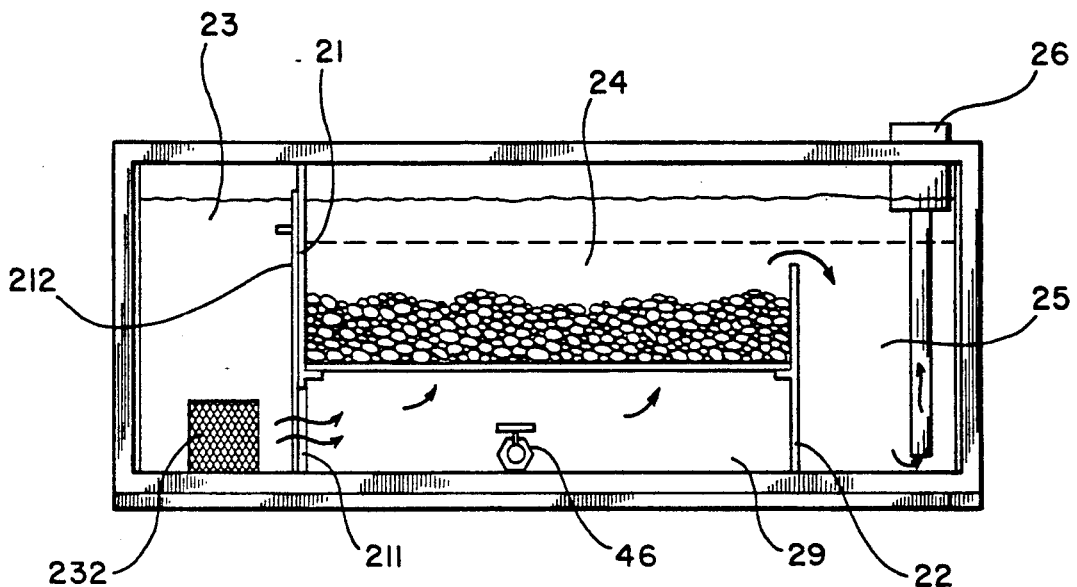
FIG. 8 is a plan side view of the aquarium of FIG. 4 showing the flowing direction of the water in the aquarium during a filtration process.
Figure 9:
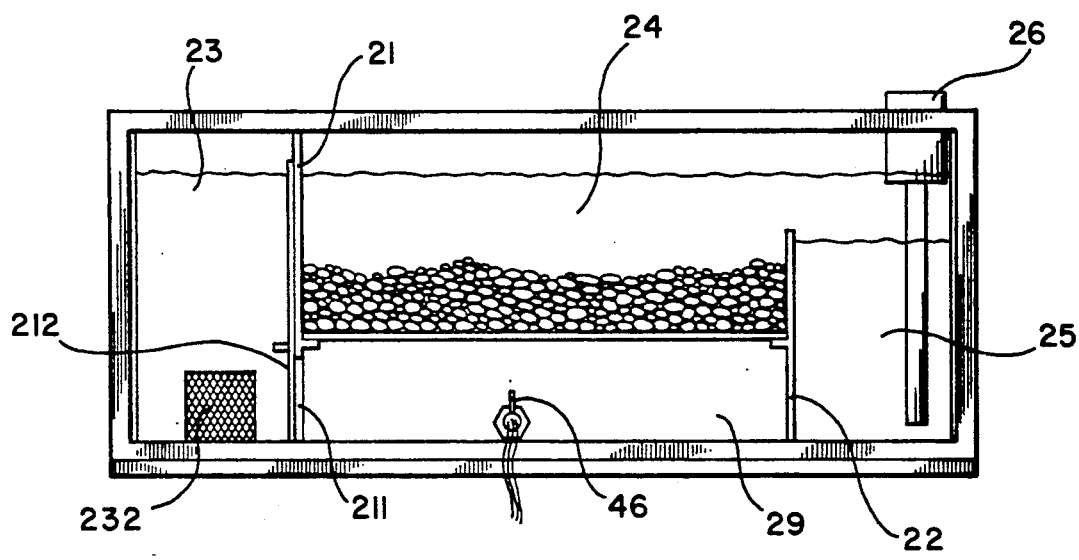
FIG. 9 is another plan side view of the aquarium of FIG. 4 showing how the water contained in the sedimentation chamber is discharged through the pipe assembly.

If the pipe assembly 30 is not to be used or the rack for holding the aquarium has no opening for receiving the pipe assembly 30, an alternate measure may be taken. As illustrated in FIG. 4, the longer partition plate 21 has a water passage 211 between the dirty water chamber 23 and the filtration chamber 24 controlled by a sluice 212. Because the pipe assembly 30 is not used, the two pipe connectors 41 on the bottom edge of the housing 10 are respectively sealed by additional plugs 45, and the plug 45 on the other pipe connector 41 in the through-holes 131, 242 is replaced with a valve 46 fastened therein for controlling its passageway. The operation of this alternate form of aquarium is outlined hereinafter with reference to FIGS. 8 and 9. The sluice 212 is pulled up and secured in an opened position to let water from the housing 10 to pass through the water passage 211 for water circulation. When it is desired to wash filtration chamber 24, the water pump 26 is stopped while the sluice 212 is moved down to close the water passage 211, and then, the valve 46 is opened to let water discharge out of the sedimentation chamber 29.

As indicated, the water in the aquarium is continuously filtrated while it is pumped to circulate between the housing 10 and the filter tank 20. Further, the arrangement of the pipe assembly 30 and the design of the filter tank 20 make washing of the filter bed easy.

Although described with reference to preferred embodiments of the invention, it is to be understood that various changes and/or modifications can be made without departing from the spirit of the invention. In general, the invention is only intended to be limited by the scope of the following claims.

What is claimed is:

1. An aquarium for keeping live water animals and water plants comprising:

a housing having side walls sealingly joined to a bottom thereof, said housing further having a first through-hole and a second through-hole formed in a bottom portion thereof;

a filter tank fastened within said housing for filtering water contained therein, said filter tank having a first vertically extending partition board and a second vertically extending partition board fastened therein, said first and second partition boards being laterally spaced so as to divide said filter tank into a dirty water chamber at one end, a filtration chamber at the middle and a clean water chamber at an opposite end, said first partition board functioning to prevent water in said dirty water chamber from flowing to said filtration chamber and said clean water chamber, said second partition board permitting water from said filtration chamber to flow to said clean water chamber thereabove, said filtration chamber defining therein a sedimentation chamber at a bottom portion thereof and having a filter bed transversely set therein above said sedimentation chamber, said filter bed being comprised of a gauze filter and a pile of filter stones, said dirty water chamber having a water intake port formed in a lower portion thereof for the passing therethrough of water from said housing and a through-hole in a bottom portion thereof which is connected to said first through-hole of said housing by a first pipe connector, said sedimentation chamber having a through-hole formed in a bottom portion thereof connected to said second through-hole of said housing by a second pipe connector, and a water pump for pumping water from said clean water chamber to said housing; and a pipe assembly comprising a three-way pipe having a first port connected to said first pipe connector through a first control valve, a second port connected to said second pipe connector, and a third port connected to a drain pipe through a second control valve;

wherein said first control valve is opened and said second control valve is closed, when said water pump is turned on to pump water from said clean water chamber to said housing, so as to permit water to be filtrated through said filter bed and circulated between said housing and said filter tank; and said first control valve is adapted to be closed and said second control valve to be opened, when said water pump is stopped, to permit water to be discharged out of said sedimentation chamber for washing said filter bed.

2. The aquarium of claim 1, wherein said bottom is rectangular and four side walls are vertically connected to said bottom with rubber packings sealed in the connections, said bottom and side walls each being comprised of a rectangular frame with a sheet of glass fastened therein and having a plurality of holes around the periphery of the rectangular frame thereof for connecting to one another by means of fasteners extending through the holes.

3. An aquarium for keeping live water animals and water plants comprising:

a housing having side walls sealingly joined to a bottom thereof, said housing further having a first through-hole formed in a bottom portion thereof;

a filter tank fastened within said housing for filtering water contained therein, said filter tank having a first vertically extending partition board and a second vertically extending partition board fastened therein, said first and second partition boards being laterally spaced so as to divide said filter tank into a dirty water chamber at one end, a filtration chamber at the middle and a clean water chamber at an opposite end, said first partition board functioning to prevent water in said dirty water chamber from flowing to said filtration chamber and said clean water chamber, said second partition board permitting water from said filtration chamber to flow to said clean water chamber thereabove, said filtration chamber defining therein a sedimentation chamber at a bottom portion thereof and having a filter bed transversely set therein above said sedimentation chamber, said filter bed being comprised of a gauze filter and a pile of filter stones, said dirty water chamber having a water intake port formed in a lower portion thereof for the passing therethrough of water from said housing, said first partition board having a water passage formed in a lower portion thereof interconnecting and permitting flow between said dirty water chamber and said sedimentation chamber, said filter tank further including a sluice for controlling the opening and closing of the water passage formed in said first partition board, said filter tank also including a through-hole formed in said sedimentation chamber connected to said first through-hole of said housing by a pipe connector and a water valve for drainage control.

* * * * *